United States Patent Office 3,046,809
Patented July 31, 1962

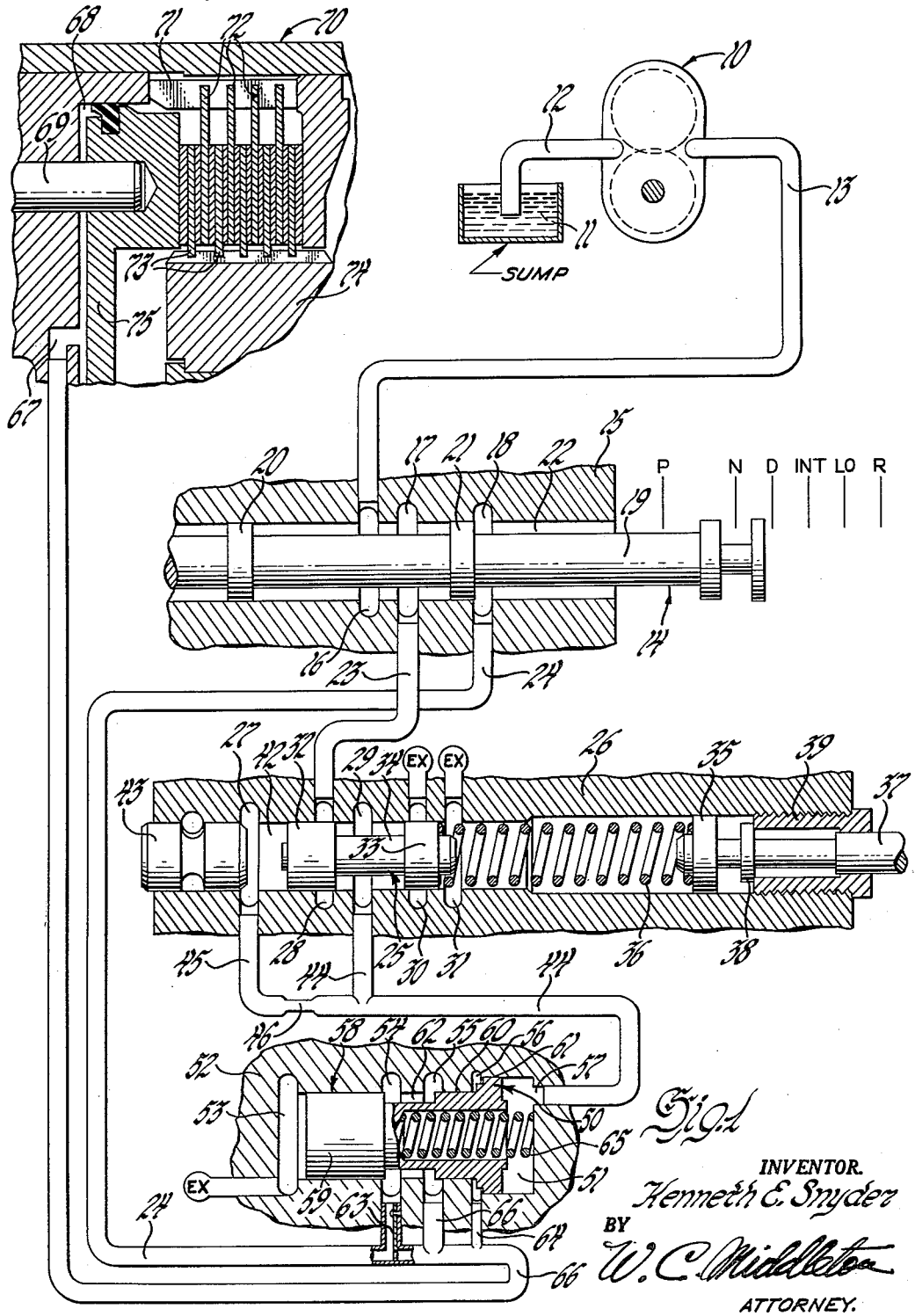

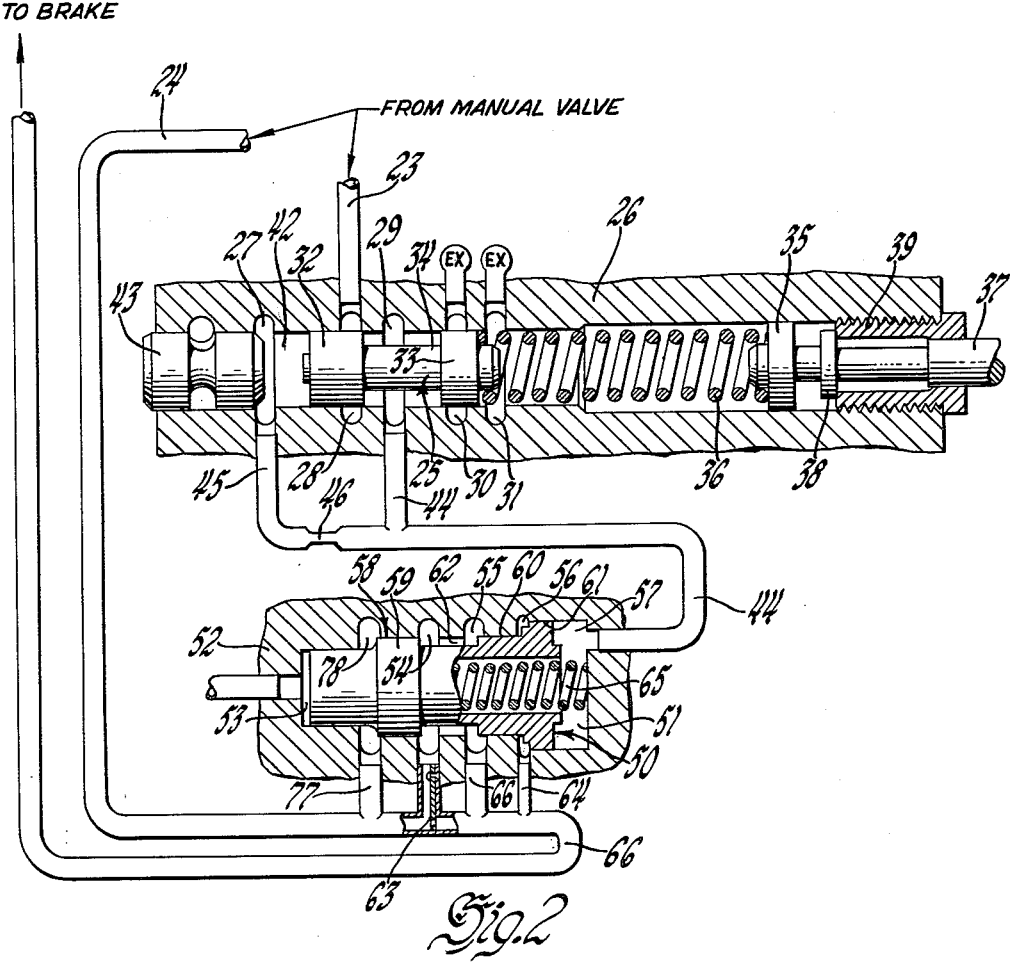

3,046,809
SERVO PRESSURE REGULATOR
Kenneth E. Snyder, Northville, Mich., assignor to General Motors Corporation, Detroit, Mich., a corporation of Delaware
Filed Nov. 13, 1956, Ser. No. 621,617
12 Claims. (Cl. 74—472)

This invention relates to controls for automatic transmissions and more particularly to an improved control for transmissions of the type having a manually operable drive range selector valve adapted to be positioned to select different conditions of transmission operation including neutral and forward operation. In conventional transmissions of this type there is a noticeable and objectionable power surge which occurs when the driver shifts from neutral to forward drive, caused by too rapid engagement of one of the torque transmitting elements in the transmission. This condition is particularly objectionable in vehicles equipped with engines having an automatic fast idle control for speeding up the engine upon initial start when the engine is cold.

By this invention, the rate of pressure build up in one of the transmission servo elements is variably controlled to provide smooth engagement of the mechanism operated by the servo, to thereby smooth out the engagement of the torque transmitting element operated by the servo and eliminate the power surge which otherwise occurs when shifting from neutral to forward drive. This is accomplished by initially regulating the rate of pressure build up in a servo mechanism to provide smooth actuation of the mechanism operated thereby without objectionable power surge and by thereafter permitting the pressure to gradually build up to maximum line pressure. To perform this function a pressure regulator valve controlled by pressure in the servo and by a variable metered pressure under control of the vehicle operator is positioned in the hydraulic circuit between the drive range selector valve and the servo as hereafter more fully explained. The control system described herein is particularly designed for use in connection with an automatic transmission of the type fully disclosed and described in the application for United States Letters Patent of August H. Borman, Jr., et al., Serial Number 477,832 filed December 27, 1954, but may be used in other transmissions as desired.

An object of this invention is to provide a control system for controlling the admission of fluid under pressure to a transmission servo member including a manually operable valve and a pressure regulating valve effective when the manually operable valve is positioned to direct fluid under pressure to the servo member to vary the hydro-static force of fluid to the servo to assure smooth engagement of the mechanism actuated by the servo member.

Another object of this invention is to provide in a control system for controlling the admission of fluid under pressure to a transmission servo member, a pressure regulating valve for varying the hydro-static force of fluid under pressure to the servo member together with additional driver operable means for controlling the pressure regulating valve.

An additional object of this invention is to provide in a control system for controlling the admission of fluid under pressure to a transmission servo member, a pressure regulating valve adapted to provide a variable restriction to flow of fluid to the servo member and responsive to fluid pressure build up in the servo member to increase its restrictive action as pressure is increased in the servo member.

A further object of this invention is to provide in a control system for controlling the admission of fluid under pressure to a transmission servo member, a valve adapted to variably restrict the flow of fluid under pressure to the servo member wherein the valve is responsive to pressure in the servo to increase its restrictive action and is responsive to a variable fluid pressure under control of an accelerator pedal controlled pressure metering valve to decrease its restrictive action as the accelerator pedal is moved from a throttle closing toward a throttle opening position.

A further object of this invention is to provide a pressure regulating valve of the type described particularly adapted to provide a snap action when moving from its cut-off position to its open position to assure a quick dump of fluid pressure from the servo through the drive range selector valve when the drive range selector valve is positioned to select neutral condition of transmission operation.

These and other objects of this invention will be apparent from the following description and claims taken in conjunction with the accompanying drawings in which:

FIGURE 1 is a schematic diagram of one embodiment of the invention illustrating the hydraulic arrangement whereby the pressure to the servo is varied to provide for smooth actuation of the mechanism operated by the servo, FIGURE 2 is a schematic diagram of a modified form of a pressure regulating valve which may be substituted for the pressure regulating valve of FIGURE 1.

Referring to FIGURE 1, there is shown a pump 10 which may be engine driven to draw transmission control fluid, such as oil, from a sump 11 through a passage 12 and deliver the same under pressure to a driver operable drive range selector valve 14 by way of a passage 13. A line pressure regulator valve, not shown, may be disposed in passage 13 to limit the maximum pressure desired in passage 13. Valve 14 includes a casing 15 provided with ports 16, 17, 18 and 22 and a valve stem 19 having lands 20 and 21 formed thereon. Valve 14 may be controlled by any suitable control linkage (not shown) which may be operated by the vehicle driver to select various conditions of transmission operation including neutral and forward drive. Also indicated on the drawing are the park, intermediate range, low range, and reverse positions of valve 14. Passage 13 is connected to port 16 of valve 14. An exhaust port 22 is provided between stem 19 and port 18. A passage 23 connects port 17 of valve 14 to a port 28 of a pressure regulating valve 25. A passage 24 connects port 18 of valve 14 to a port 54 of a regulating valve indicated generally at 50. A servo piston 75 is hydraulically connected to the valve 50 and to passage 24 by means of a passage 66.

Valve 25 includes a casing 26 having ports 27, 28, 29, 30 and 31 therein. Valve 25 is composed of a pair of lands 32 and 33 joined by a reduced stem section 34. The position of valve 25 in casing 26 is varied by means of a plunger 35, adapted to apply force to land 33 by means of a spring 36. Plunger 35 is provided with a stem 37 extending outwardly from casing 26 and adapted to be controlled by the vehicle accelerator pedal, not shown, through a control linkage, not shown, arranged to force stem 37 into casing 26 to compress spring 36 as the accelerator pedal is moved from a throttle closing to a throttle opening position. Stem 37 is provided with a stop member 38 formed thereon and adapted to contact a member 39 when the accelerator pedal is released. The stop member 39 is screw threaded casing 26 so that spring 26 may be adjustably loaded as desired to calibrate the action of valve 25. Ports 30 and 31 connect the valve bore to exhaust. Port 29 is a delivery port for delivering variable metered pressure to a passage 44. Port 28 is the line pressure supply port connected to passage 23. Port 27 connects a chamber 42 at one end of land 32 to passage 44 by means of a passage 45 having a restriction 46 therein. A plug 43 blocks off the end of the valve bore adjacent chamber 42.

Passage 44 extends to a control chamber 51 of a pressure regulating valve 50 having a casing 52 having ports 53, 54, 55, 56 and 57 therein. A valve body 58 is formed of lands 59 and 60 of equal diameter and a land 61 of greater diameter than that of lands 59 and 60, all formed as a unit. Valve body 58 is recessed at 62 intermediate lands 59 and 60. Port 53 exhausts to sump. Port 54 admits line pressure from passage 24 to the valve bore, port 55 is a delivery port to passage 66, which port 56 is a pressure feed back port to admit pressure from passage 66 to the valve bore. A restriction 63 is disposed in passage 24 on the downstream side of port 54. A restricted passage 64 connects passage 66 to valve port 56. A spring 65 yieldably biases the valve 58 to connect port 54 to port 55 so that initial fluid flow from passage 24 to passage 66 will be had through ports 54 and 55.

Passage 66 connects to a chamber 68 of a servo mechanism indicated generally at 70 through a port 67. In the embodiment shown, a set of discs 72 are carried by a non-rotatable member 71, the discs being splined to member 71 for axial slidable motion with respect thereto. A second set of discs 73 are carried by a rotatable member 74, the discs being splined to member 74 so as to be non-rotatable with respect to member 74 and axially movable on member 74. A piston 75 is adapted to engage discs 72 and 73 to prevent rotation of member 74 when shifting from neutral to forward drive. A pin 69 fixes piston 75 against rotation, but permits axial motion of piston 75 in response to fluid pressure applied in chamber 68. The servo unit 70 constitutes a brake unit adapted to be applied to prevent rotation of an element of a planetary gearing unit when power is to be transmitted through the gearing unit and released when neutral is to be established. Such a unit is shown in the Borman, Jr. et al. application, Serial No. 477,832 heretofore identified.

*Throttle Valve Operation*

The throttle valve 25 is adapted to receive pump line pressure from passage 23 and deliver a variable pressure which varies between a minimum pressure when the accelerator pedal is retarded to a maximum pressure (line pressure) with a fully advanced accelerator pedal position to passage 44, and hence to control chamber 51 of pressure regulator valve 50. At a retarded accelerator pedal position, spring 36 will exert a relatively light pressure upon land 33 to position valve member 25 to admit pressure from port 28 to port 29 and hence to chamber 51 of valve 50. As pressure builds up in chamber 51, oil will pass through restriction 46 and passage 45 to chamber 42 adjacent land 32. This pressure acting upon valve member 25 will move the valve to block off port 28 from port 29, thereby maintaining a minimum pressure in passage 44 and chamber 51. When the accelerator pedal is depressed, spring 36 is loaded to move valve 25 to connect ports 28 and 29 to admit fluid under pressure to passage 44, and chamber 42 until the pressure in chamber 42 is effective to move valve 25 to block off port 28 from port 29. Thus, a new pressure will be established in passage 44 and chamber 51 of valve 50 which is determined by the load applied to spring 36. Assuming that the accelerator pedal is then retarded or partially retarded, fluid pressure in chamber 42 will move valve 25 to connect port 29 to exhaust port 30, thereby reducing the pressure in passage 44 to a new pressure determined by the load maintained upon spring 36. Restriction 46 in passage 45 serves as a dampener to prevent rapid fluctuation or valve shudder of valve 25 as might otherwise occur.

*Pressure Regulator Operation*

Spring 65 and metered pressure in chamber 51 of timing valve 50 act upon valve 58 to position the valve to connect passage 24 to passage 66 by way of ports 54 and 55 to provide a substantially unrestricted flow path from passage 24 to passage 66 when the valve is in its fully open position as illustrated. As fluid pressure builds up in chamber 68 of the brake servo 70, the fluid under pressure is directed from passage 66 through restricted passage 64 to port 56 adjacent land 61 of valve body 58. This pressure acting upon land 61 will move valve 58 against the action of spring 65 and fluid pressure in chamber 51 to either completely or partially block off port 54 from port 55, thereby establishing a variable restriction in the flow path through ports 54 and 55. In passing from passage 24 to passage 66, fluid will seek this flow path due to the effect of fixed restriction 63.

The force of spring 65 and the diameter of land 61 are calibrated such that, assuming that the accelerator pedal is released, upon a predetermined pressure build up, for example ten pounds, in servo chamber 68 and in chamber 56 of valve 58, the servo plates 72 and 73 will be engaged and valve 58 will move from its open position shown in FIGURE 1 to its cut off position wherein ports 54 and 55 are blocked off from each other by land 59. The admission of fluid pressure to servo chamber 68 thereafter is through restriction 63. Thus, after valve 58 has moved to its cut-off position, the pressure in chamber 68 is permitted to increase to full line pressure, for example 80 pounds per square inch, due to the action of restriction 63. The function of throttle valve pressure in chamber 51 is to vary the cut-off point of valve 58 in accordance with torque demand. Thus, in the event that the accelerator pedal is depressed to partially open the engine throttle, a higher pressure will be required in servo chamber 68 and in chamber 56 to cause valve 50 to move to its cut off position. In this manner, the initial torque carrying capacity of plates 72 and 73 is varied to correspond to torque demand to prevent undue slippage and damage to the plates. At the same time, initial engagement of plates 72 and 73 is accomplished without any undesirable power surge as heretofore experienced.

Assuming that the drive range selector valve 14 is disposed for neutral operation, brake servo chamber 68 will be connected to exhaust through passage 66, passage 24, and ports 18 and 22 of valve 14. With valve 14 positioned for drive range operation, valve 58 will initially be positioned by spring 65 and metered pressure in chamber 51 to admit fluid under pressure from passage 24 to passage 66 through a substantially unrestricted path by way of ports 54 and 55 to provide initial engagement of discs 72 and 73. Upon such initial engagement, fluid pressure in chamber 68 and passage 66 will rise, thereby increasing the pressure in restricted passage 64 and port 56 of valve 50 to move the valve body against the action of spring 65 and pressure in chamber 51. With a retarded throttle, the metered pressure in chamber 51 will be relatively low so that valve body 58 will be quickly moved in response to pressure in servo chamber 68 to provide restricted flow of fluid from passage 24 to passage 66. With an advanced throttle, the pressure in chamber 51 will be relatively high. The fluid pressure acting through port 56 on land 61 will be unable to move the valve body 58 to restrict the flow through ports 54 and 55 until a later time. In either case, with a fully advanced or fully retarded throttle, the initial engaging contact is accomplished through a substantially unrestricted flow path, with the rate of pressure build up thereafter being determined by the position of the accelerator pedal. With a retarded throttle, the variable restriction is rendered effective at a relatively early time to delay the rate of pressure build up in chamber 68 of servo 70. It will be understood that fixed restriction 63 is effective to admit fluid under pressure from passage 24 to passage 66 when valve body 58 is moved to block off port 54 from port 55. This function of delaying the rate of pressure build up in servo chamber 68 at light throttle after initial engaging contact of plates 72 and 73 results in smooth engagement of plates 72 and 73 without harshness. Since the plates are under light load at closed throttle there is no danger of burning up the plates during their final engaging action. As the engine throttle is advanced, the load to be carried by plates 72 and 73 is increased so that it become necessary that the plates be engaged more rapidly than is the case at closed throttle to prevent undue wear on the friction plates. This is accomplished through action of metered pressure in chamber 51 which increases as the accelerator pedal is depressed to open the throttle and acts upon valve body 58 to delay the time at which valve body 58 becomes effective to block off port 54 from port 55. It will be apparent, therefore, that the timing valve is controlled by fluid pressure delivered by pressure metering valve 26 to provide a delayed completion of the engaging action at retarded throttle, and to provide a relatively fast engaging action at advanced throttle, and that the plate engaging action is accomplished in two steps and becomes more rapid as the throttle is advanced. The initial contact of discs 72 and 73 is effected without restriction with either an advanced or retarded throttle, but completion of the engaging action is delayed a maximum amount at closed throttle and a minimum amount of full throttle, the delay in pressure build up being varied in accordance with the position of the accelerator between these two extremes. Thus, upon shifting from neutral to forward drive, the objectionable power surge formerly present has been eliminated by the action of timing valve 50, which is controlled by pressure metering valve 26 to vary the rate at which pressure is built up in servo chamber 68 to permit the discs 72 and 73 to complete their engagement more rapidly as the load applied thereto is increased.

In FIGURE 2, there is shown a modified form of pressure regulator valve arrangement particularly constructed to assure a rapid discharge of fluid from servo 68 of FIGURE 1 when the drive range selector valve is moved to its neutral position. By this arrangement a more positive snap action movement of valve 58 to its fully open position upon movement of the drive range selector valve to its neutral position is obtained. In the FIGURE 1 embodiment a relatively weak spring, for example two pounds is used. In the FIGURE 2 embodiment a relatively strong spring, for example five pounds, is used. It is desirable that when the drive range selector valve is moved from neutral to drive range, that the net thrust of spring 65 be maintained at two pounds. To accomplish this, passage 24 is connected to a chamber 78 adjacent land 59 by way of passage 77. The diameter of land 59 acted upon by line pressure in chamber 78 is chosen such that a three pound thrust is exerted upon valve 58 in opposition to the five pound thrust of spring 65. Thus, in normal operation, spring 65 provides a net thrust of two pounds to oppose the thrust on valve 58 arising from action of fluid pressure in chamber 56. In drive range operation, the action of valve 58 in FIGURE 2 is the same as that of FIGURE 1. However, when drive range selector valve 14 is positioned for neutral operation, the working fluid is quickly dumped from chamber 78 through ports 18 and 22 of valve 14. Spring 65 is then effective to exert a net force of five pounds upon valve 58, giving a positive snap action movement of valve 58 to its fully open position.

While two embodiments of my invention have been disclosed and described, it will be apparent that various additional modifications may be made therein without departing from the spirit and scope thereof as set forth in the appended claims.

What is claimed is:
1. In a control system for a transmission having a fluid pressure responsive servo member and mechanism actuated thereby, a fluid pressure source, a manually operable valve, a fluid pressure supply passage connecting said valve to said source, a fluid pressure delivery passage connecting said valve to said servo member, a fixed restriction in said pressure delivery passage, a pressure regulator valve including a valve member having a pair of spaced lands of equal diameter and a third land of greater diameter than said pair of lands all formed as an integral unit, said pressure regulator valve having a first port hydraulically connected to said pressure delivery passage on the upstream side of said fixed restriction and second port hydraulically connected to said pressure delivery passage on the downstream side of said fixed restriction, a control chamber associated with the relatively large diameter land of said pressure regulator valve and hydraulically connected to said pressure delivery passage between said servo member and said fixed restriction, means yieldably biasing said pressure regulator valve to hydraulically connect said first and second ports to each other, the pressure in said servo member being continuously effective in said control chamber irrespective of the position of said pressure regulator valve in its path of travel to bias said pressure regulator valve to block off fluid flow through said first and second ports.

2. In a control system for a transmission having a fluid pressure responsive servo member and mechanism actuated thereby, a fluid pressure source, a drive range selector valve adapted to be positioned to establish neutral and drive conditions of transmission operation, a first passage for delivering fluid under pressure from said source to said selector valve, a second passage hydraulically connecting said selector valve to said servo, said selector valve being effective in its neutral position to connect said second passage to exhaust and effective in its drive position to connect said first passage to said second passage to deliver pressure to said servo through said second passage, a restriction in said second passage permitting restricted fluid flow from said selector valve to said servo through said second passage, a by-pass passage connected hydraulically in parallel with said second passage, said by-pass passage having one branch thereof connected to said second passage between said drive range selector valve and said restriction and a second branch thereof connected to said second passage between said servo and said restriction, a movable valve member in said by-pass passage for controlling fluid flow around said restriction, said valve member comprising a pair of spaced lands of equal diameter for controlling fluid flow through said first and second branches of said by-pass passage and a third land of greater diameter than said first and second lands formed integrally with said first and second lands, a first control chamber at one side of said third land hydraulically connected to said second passage between said servo and said restriction, spring means yieldably biasing said movable valve member to permit fluid flow through said by-pass passage to provide a substantially unrestricted flow of fluid from said drive range selector valve to said servo member, said valve member being movable in response to rise in pressure in said servo member and said first control chamber to block off said by-pass passage to thereby connect said servo member to said drive range selector valve solely through said restriction, a second control chamber at the opposite side of said third land, and a manually operable pressure metering valve connected to said fluid pressure source and said third control chamber, said pressure metering valve being operable to deliver variable pressure to said second control chamber, the pressure in said third control chamber acting in assistance to said spring to bias said valve member toward a position to permit fluid flow from said drive range selector valve to said servo member through said by-pass passage.

3. In a control system for a transmission having a fluid pressure responsive servo member and mechanism actuated thereby, a fluid pressure source, a first valve connected to said source, a first passage connecting said servo member to said first valve, said first valve being selectively operable to connect said first passage to said source to establish drive through said transmission and to exhaust to establish neutral, a second valve for controlling the rate of admission of fluid pressure to said servo member, first and second ports in said second valve connected to said first passage, a restriction in said first passage positioned hydraulically between said first and second ports, said second valve including a valve member movable from a first position wherein said ports are connected to each other with a minimum hydraulic restriction to a second position wherein said ports are blocked off from each other, said movable valve member including a pair of spaced lands of equal diameter and a third land of greater diameter than said pair of lands, a first control chamber associated with said third land, a second passage connecting said control chamber to said first passage between said restriction and said servo member whereby fluid pressure in said servo member is continuously admitted to said first control chamber irrespective of the position of said movable valve member in its path of travel, said movable valve member being movable from its first position to its second position in response to a rise in pressure in said servo member and said first control chamber, a second control chamber associated with said third land, and an accelerator pedal controlled valve connected to said source and to said second control chamber, said accelerator pedal controlled valve being effective to deliver a variable pressure to said second control chamber which increases as said accelerator pedal is depressed, said movable valve member being movable in rise in pressure in said second control chamber to decrease its restriction to fluid flow through said ports upon a rise of pressure in said second control chamber.

4. In a transmission control system, a fluid pressure source, a fluid pressure responsive servo member adapted to be connected to said fluid pressure source, means for selectively connecting said servo member to said fluid pressure source and to exhaust including a drive range selector valve, a first passage connecting said selector valve to said source, a second passage connecting said selector valve to said servo member, a pressure regulator valve for varying the rate of admission of fluid pressure to said servo member, said pressure regulator valve including a movable valve member having a pair of spaced lands of equal diameter and a third land of greater diameter than said pair of spaced lands, first and second ports in said pressure regulator valve connected to said second passage, a restriction in said second passage positioned between said first and second ports, a control chamber in said pressure regulator valve adjacent said third land, a third passage connecting said control chamber to said second passage between said servo and said second port whereby said fluid pressure in said servo is continuously admitted to said control chamber irrespective of the position of said movable valve member in its path of travel, said movable valve member being movable in response to a rise in fluid pressure in said control chamber and said servo member to increasingly restrict the flow of fluid through said ports, a second control chamber associated with said third land, and a driver operable pressure metering valve connected to said source and adapted to deliver a variable pressure to said second control chamber, the pressure in said second control chamber being effective upon said third land to bias said movable valve member to reduce the restriction to fluid flow through said ports.

5. In a transmission control system, a fluid pressure source, a fluid pressure responsive servo member adapted to be connected to said fluid pressure source, a driver operable drive range selector valve operable in one position to connect said servo member to said fluid pressure source and effective in a second position to connect said servo member to exhaust, first and second passages connecting said drive range selector valve to said fluid pressure source and to said servo member, respectively, a fixed restriction in the second passage intermediate said drive range selector valve and said servo member, a by-pass valve in hydraulic parallel connection with said fixed restriction, said by-pass valve including a movable valve member having a pair of spaced lands of equal diameter and a third land of greater diameter than said pair of lands, spring means yieldably biasing said movable valve member to permit relatively unrestricted flow of fluid to said servo member, a first control chamber associated with said third land, a driver operable pressure metering valve connected to said source and adapted to deliver a variable pressure to said control chamber, a second control chamber associated with said third land and connected to said servo member, the fluid under pressure in said first control chamber being operable upon said third land to bias said movable valve member to permit relatively unrestricted flow of fluid around said fixed restriction and the fluid under pressure in said second control chamber being continuously operable upon said third land irrespective of the position of said movable valve member in its path of travel to bias said movable valve member to provide increasing restriction to the flow of fluid through said by-pass valve to thereby vary the rate of flow of fluid under pressure to said servo member.

6. In a control system for an automotive vehicle transmission, a fluid pressure source, a fluid pressure responsive servo member adapted to be connected to said fluid pressure source, means for selectively connecting said servo member to said fluid pressure source and to exhaust including a driver operable drive range selector valve, passage means connecting said drive range selector valve to said fluid pressure source and to said servo member, respectively, a fixed restriction in said passage means intermediate said drive range selector valve and said servo member, a by-pass passage in hydraulic parallel connection with said fixed restriction, a by-pass valve adapted to control said by-pass passage, said by-pass valve including a movable valve member having a pair of spaced lands of equal diameter and a third land of greater diameter than said pair of lands, spring means yieldably biasing said movable valve member to permit unrestricted fluid flow through said by-pass passage, a first control chamber associated with said third land, an accelerator pedal controlled pressure metering valve connected to said source and to said first control chamber and adapted to deliver fluid under variable pressure to said first control chamber, said pressure being increased as said accelerator pedal is depressed and decreased as said accelerator pedal is released, a second control chamber associated with said third land and connected to said servo member, the fluid under pressure in said first control chamber being effective to initially position said movable valve member to permit unrestricted flow of fluid under pressure through said by-pass passage to said servo member, the fluid under pressure in said second control chamber being thereafter effective to position said movable valve member to restrict the flow of fluid through said by-pass passage to thereby vary the rate of flow of fluid under pressure to said servo member, the fluid pressure in said second control chamber being continuously operable upon said third land irrespective of the position of said movable valve member in its path of travel to yieldably bias said movable valve member towards a position wherein said movable valve member is effective to restrict fluid flow through said by-pass passage.

7. In a control system for a transmission having a fluid pressure responsive servo member and mechanism operated thereby, a fluid pressure source, valve means selectively operable to connect said servo member to said fluid pressure source or to exhaust, a pressure regulator valve hydraulically connected to said first-mentioned valve means and to said servo member, a first control chamber adapted to receive fluid under pressure from said first valve means to bias said pressure regulator valve to restrict the flow of fluid from said first valve to said servo member, a second control chamber connected to said servo member and responsive to rise of pressure in said servo member to bias said pressure regulator valve to restrict the flow of fluid to said servo member, and spring means yieldably biasing said pressure regulator valve to provide unrestricted flow of fluid from said first valve to said servo member.

8. In a control system for a transmission having a fluid pressure responsive servo member and mechanism operated thereby, a drive range selector valve adapted to select a plurality of conditions of transmission operation including forward, neutral and reverse, said drive range selector valve being operable to connect said servo member to said fluid pressure source or to exhaust, a pressure regulator valve hydraulically connected to said drive range selector valve and to said servo member, a first control chamber in said pressure regulator valve adapted to receive fluid under pressure from said drive range selector valve to bias said pressure regulator valve to restrict the flow of fluid from said drive range selector valve to said servo member, a second control chamber in said pressure regulator valve responsive to pressure in said servo member to bias said pressure regulator valve to restrict the flow of fluid from said drive range selector valve to said servo member, and spring means yieldably biasing said pressure regulator valve in opposition to the force effect of fluid pressure in both of said control chambers to provide unrestricted flow of fluid pressure from said drive range selector valve to said servo member.

9. In a control system for a transmission having a fluid pressure responsive servo member and mechanism operated thereby, a fluid pressure source, a drive range selector valve adapted to select a plurality of conditions of transmission operation including forward, neutral and reverse, said drive range selector valve being operable to connect said servo member to said fluid pressure source or to exhaust, a pressure regulator valve hydraulically connected to said drive range selector valve and to said servo member, a first control chamber in said pressure regulator valve adapted to receive fluid under pressure from said drive range selector valve to bias said pressure regulator valve to restrict the flow of fluid from said drive range selector valve to said servo member, a second control chamber in said pressure regulator valve responsive to pressure in said servo member to bias said pressure regulator valve to restrict the flow of fluid from said drive range selector valve to said servo member, spring means yieldably biasing said pressure regulator valve in opposition to the force effect of fluid pressure in both of said control chambers, a third control chamber associated with said pressure regulator valve, and a driver operable pressure metering valve connected to said source and adapted to deliver a variable metered pressure to said last-mentioned control chamber, said variable metered pressure acting upon said pressure regulator valve in assistance to said spring to bias said pressure regulator valve to permit unrestricted fluid flow from said drive range selector valve to said servo member.

10. In a control system for a transmission having a fluid pressure responsive servo member, a fluid pressure source, a drive range selector valve adapted to select a plurality of conditions of transmission operation including forward, neutral and reverse, said drive range selector valve being effective to connect said servo member to said fluid pressure source for forward and reverse operation and to connect said servo to exhaust to establish neutral, pressure regulator valve means hydraulically connected between said drive range selector valve and said servo member, said pressure regulator valve means including a fixed restriction and a valve member movable to provide a variable restriction to flow of fluid between said drive range selector valve and said servo member, a first control chamber in said pressure regulator valve between said drive range selector valve and said fixed restriction, a second control chamber in said pressure regulator valve between said fixed restriction and said servo member, the fluid pressure in both of said control chambers being operable upon said movable valve member to bias said movable valve member to provide restricted fluid flow between said drive range selector valve and said servo member, a third control chamber associated with said pressure regulator valve, a driver operable pressure metering valve connected to said fluid pressure source and adapted to deliver a variable pressure to said third control chamber, and spring means acting upon said movable valve member, the fluid pressure in said third control chamber and said spring means being operable upon said movable valve member in opposition to the fluid pressure in said first and second control chambers.

11. In a control system for a transmission having a fluid pressure responsive servo member and mechanism operated thereby, a fluid pressure source, a drive range selector valve hydraulically connected to said source and to said servo member adapted to select a plurality of conditions of transmission operation including neutral and forward drive range, pressure regulator valve means in said control system between said drive range selector valve and said servo member, a first control chamber in said pressure regulator valve means responsive to fluid pressure in said servo member for yieldably biasing said pressure regulator valve means to restrict fluid flow between servo member and said drive range selector valve, a second control chamber in said pressure regulator valve means responsive to pressure supplied by said drive range selector valve to bias said pressure regulator valve means to restrict fluid flow between said drive range selector valve and said servo member, and spring means for biasing said pressure regulator valve means to permit unrestricted fluid flow between said drive range selector valve and said servo member, said drive range selector valve being effective in its neutral position to connect said second control chamber to exhaust to permit said spring means to position said pressure regulator valve means to permit unrestricted fluid flow from said servo member to said drive range selector valve.

12. In a control system for a transmission having a fluid pressure responsive servo member and mechanism operated thereby, a fluid pressure source, a drive range selector valve hydraulically connected to said source and to said servo member adapted to select a plurality of conditions of transmission operation including neutral and forward drive range, pressure regulator valve means in said control system between said drive range selector valve and said servo member, a first control chamber in said pressure regulator valve means responsive to fluid pressure in said servo member for biasing pressure regulator valve means to restrict flow of fluid between said servo member and said drive range selector valve, a second control chamber in said pressure regulator valve means responsive to pressure supplied by said drive range selector valve to bias said pressure regulator valve means to restrict flow of fluid between said drive range selector valve and said servo member, spring means for biasing said pressure regulator valve means to permit unrestricted fluid flow between said drive range selector valve and said servo member, said drive range selector valve being effective in its neutral position to connect said second control chamber to exhaust to permit said spring means to move said pressure regulator valve to permit unrestricted fluid flow from said servo member to said drive range selector valve, a third control chamber associated with said pressure regulator valve, and an accelerator pedal controlled pressure metering valve connected to said source and to said third control chamber, said pressure metering valve being effective to deliver a variable pressure to said third control chamber which increases as the accelerator pedal is moved from a throttle closing to a throttle opening position, the pressure in said third control chamber acting in assistance to said spring in its effect upon said pressure regulator valve.

References Cited in the file of this patent

UNITED STATES PATENTS

| | | |
|---|---|---|
| 2,740,304 | Sheppard | Apr. 3, 1956 |
| 2,756,851 | Collins | July 31, 1956 |
| 2,788,678 | Sheppard | Apr. 16, 1957 |
| 2,800,036 | Miller | July 23, 1957 |
| 2,870,782 | Lindsey | Jan. 27, 1959 |
| 2,919,597 | Borman | Jan. 5, 1960 |